US012700740B1

(12) United States Patent　　　　(10) Patent No.:　US 12,700,740 B1

Bult　　　　　　　　　　　　　　　　　(45) Date of Patent:　　　Aug. 4, 2026

(54) CIRCUITS FOR PROVIDING POWER SUPPLY USING FLOATING CAPACITIVE SUPPLY

(71) Applicant: Ethernovia Inc., San Jose, CA (US)

(72) Inventor: Klaas Bult, Bosch en Duin (NL)

(73) Assignee: Ethernovia Inc., San Jose, CA (US)

( * ) Notice:　Subject to any disclaimer, the term of this patent is extended or adjusted under 35 U.S.C. 154(b) by 1053 days.

(21) Appl. No.: 17/662,631

(22) Filed:　　May 9, 2022

Related U.S. Application Data

(60) Provisional application No. 63/188,235, filed on May 13, 2021.

(51) Int. Cl.
　　　*H02J 7/34*　　　　(2006.01)
　　　*H02J 7/00*　　　　(2006.01)

(52) U.S. Cl.
　　　CPC ............. *H02J 7/345* (2013.01); *H02J 7/865* (2026.01)

(58) Field of Classification Search
　　　CPC ...................................................... H02J 7/345
　　　USPC ......................................................... 320/143
　　　See application file for complete search history.

(56)　　　　　　　References Cited

U.S. PATENT DOCUMENTS

| | | | | |
|---|---|---|---|---|
| 6,476,586 | B2 * | 11/2002 | Yunosawa | E05B 77/12 307/108 |
| 2008/0100382 | A1 * | 5/2008 | Fisher | H03F 3/245 330/288 |
| 2013/0020960 | A1 * | 1/2013 | Ren | H02M 3/07 327/536 |

| | | | | |
|---|---|---|---|---|
| 2020/0007085 | A1 | 1/2020 | Hsieh et al. | |
| 2020/0126616 | A1 | 4/2020 | Conte | |
| 2020/0274385 | A1 * | 8/2020 | Saito | H02M 1/36 |

FOREIGN PATENT DOCUMENTS

| | | |
|---|---|---|
| CN | 108270402 A | 7/2018 |
| CN | 111884609 A | 11/2020 |
| WO | WO-2013164229 A1 | 11/2013 |

OTHER PUBLICATIONS

"U.S. Appl. No. 17/822,252, Final Office Action mailed May 8, 2025", 28 pgs.
"U.S. Appl. No. 17/822,252, Non Final Office Action mailed Jan. 17, 2025", 25 pgs.
"U.S. Appl. No. 17/822,252, Non Final Office Action mailed Nov. 28, 2025", 27 pgs.
"U.S. Appl. No. 17/822,252, Response filed Apr. 17, 2025 to Non Final Office Action mailed Jan. 17, 2025", 17 pgs.
"U.S. Appl. No. 17/822,252, Response filed Nov. 10, 2025 to Final Office Action mailed May 8, 2025", 15 pgs.
Tan, Zhichao, et al., "Incremental Delta Sigma ADCs a Tutorial Review,", IEEE Transactions on Circuits vol. 67 Issue 12, (Nov. 19, 2020), 13 pgs.

* cited by examiner

*Primary Examiner* — Yalkew Fantu
(74) *Attorney, Agent, or Firm* — Schwegman, Lundberg & Woessner, P.A.

(57)　　　　　　　ABSTRACT

Various embodiments include methods and circuits for providing power supply to circuits using floating capacitive supply. A circuit includes a power supply, a capacitor, an analog circuit, a first plurality of switches communicatively coupled between the power supply and the capacitor, and a second plurality of switches communicatively coupled between the capacitor and the analog circuit. The first plurality of switches and the second plurality of switches are configured to implement a charging configuration in the circuit and a discharging configuration in the circuit.

12 Claims, 8 Drawing Sheets

200

SUB-CIRCUIT

202

S1   S2

208

S1

S2

S2   S1

204

S1

Vdd

206

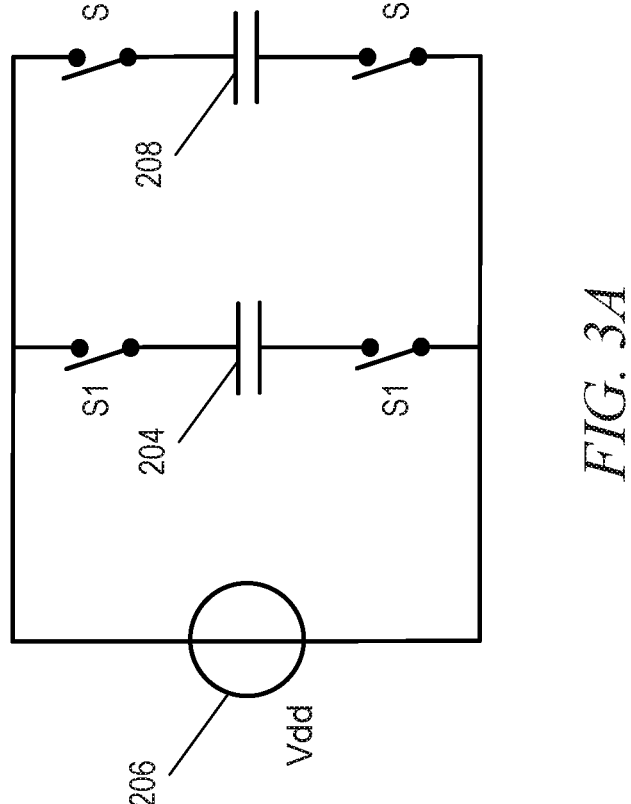
*FIG. 3A*

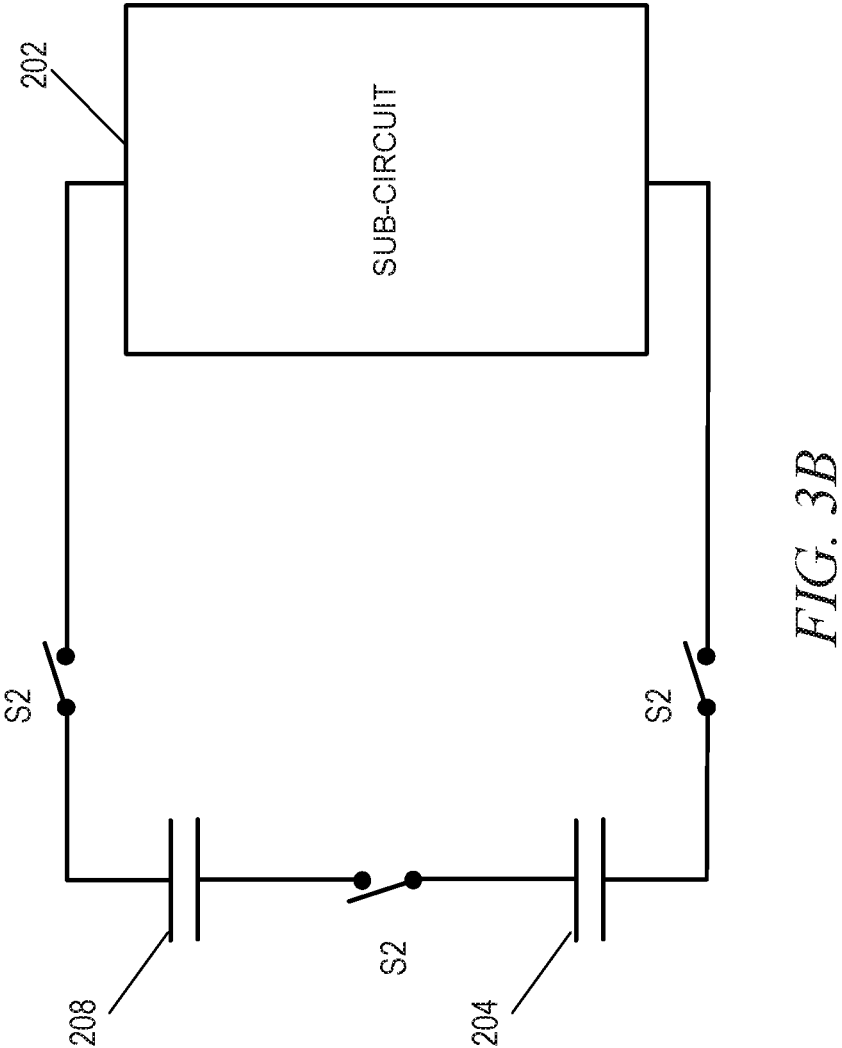
*FIG. 3B*

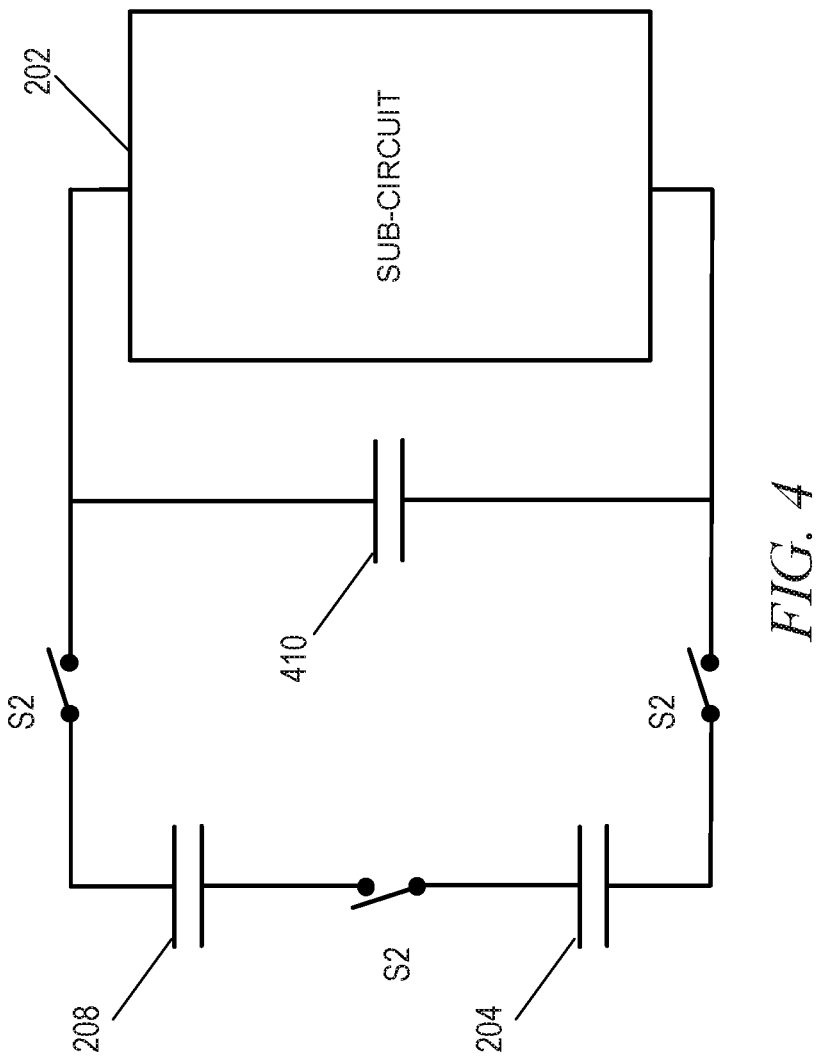
*FIG. 4*

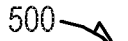

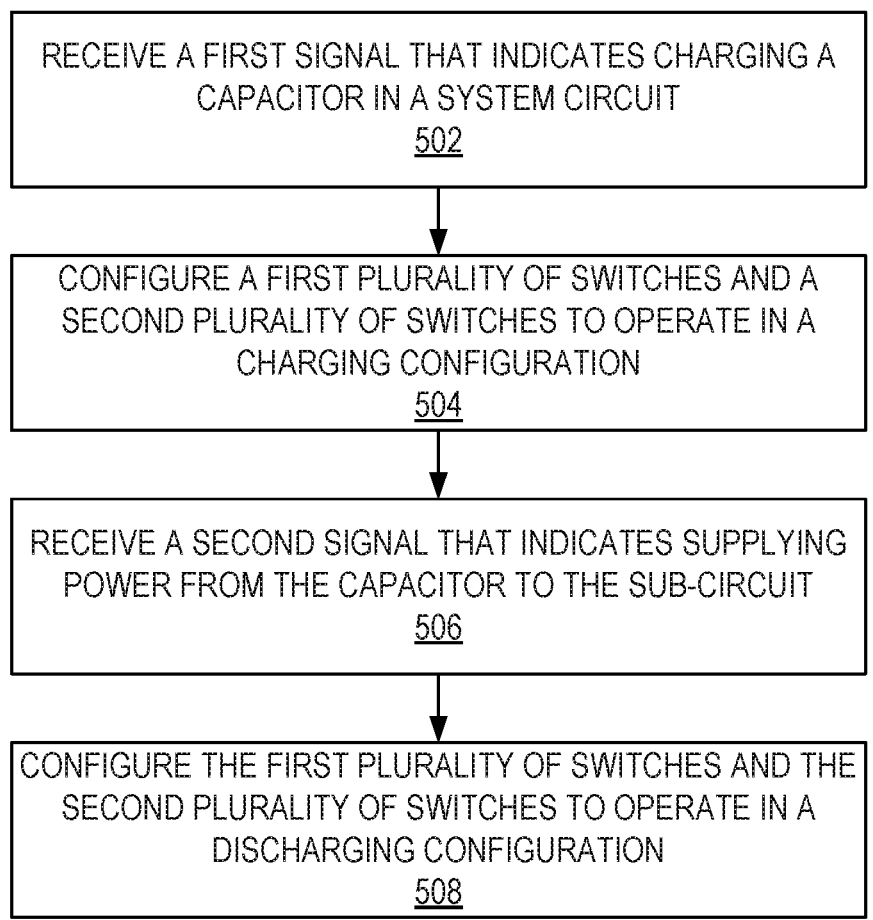

RECEIVE A FIRST SIGNAL THAT INDICATES CHARGING A
CAPACITOR IN A SYSTEM CIRCUIT
502

CONFIGURE A FIRST PLURALITY OF SWITCHES AND A
SECOND PLURALITY OF SWITCHES TO OPERATE IN A
CHARGING CONFIGURATION
504

RECEIVE A SECOND SIGNAL THAT INDICATES SUPPLYING
POWER FROM THE CAPACITOR TO THE SUB-CIRCUIT
506

CONFIGURE THE FIRST PLURALITY OF SWITCHES AND THE
SECOND PLURALITY OF SWITCHES TO OPERATE IN A
DISCHARGING CONFIGURATION
508

CIRCUITS FOR PROVIDING POWER SUPPLY USING FLOATING CAPACITIVE SUPPLY

CROSS-REFERENCE TO RELATED APPLICATIONS

The present application claims the benefit of priority of U.S. Provisional Application No. 63/188,235 filed on May 13, 2021, which is incorporated herein by reference in its entirety

TECHNICAL FIELD

The subject matter disclosed herein generally relates to methods and circuits for providing power supply to electrical circuits using a floating capacitive supply.

BACKGROUND

In electronics, both analog circuits and digital circuits may reside on an integrated circuit, such as a chip. Therefore, the analog and digital circuits may share the same set of pins provided by the chip and may need to share a common power supply. In situations where the chip provides a limited number of pins and/or where the power supply to the chip is relatively low, the performance of analog circuits may be negatively affected.

BRIEF DESCRIPTION OF THE SEVERAL VIEWS OF THE DRAWINGS

Various ones of the appended drawings merely illustrate embodiments of the present disclosure and should not be considered as limiting its scope. In the drawings, which are not necessarily drawn to scale, like numerals may describe similar components in different views. Like numerals having different letter suffixes may represent different instances of similar components.

FIG. 3A is a diagram of an example circuit that includes a sub-circuit with floating capacitive supply in charging configuration, according to various embodiments.

FIG. 3B is a diagram of an example circuit that includes a sub-circuit with floating capacitive supply in discharging configuration, according to various embodiments.

FIG. 4 is a diagram of an example circuit that includes a sub-circuit with floating capacitive supply in charging configuration, according to various embodiments.

FIG. 5 is a flowchart illustrating a method of providing floating capacitive supply to an example circuit during operation, according to various embodiments.

DETAILED DESCRIPTION

Figure 1:
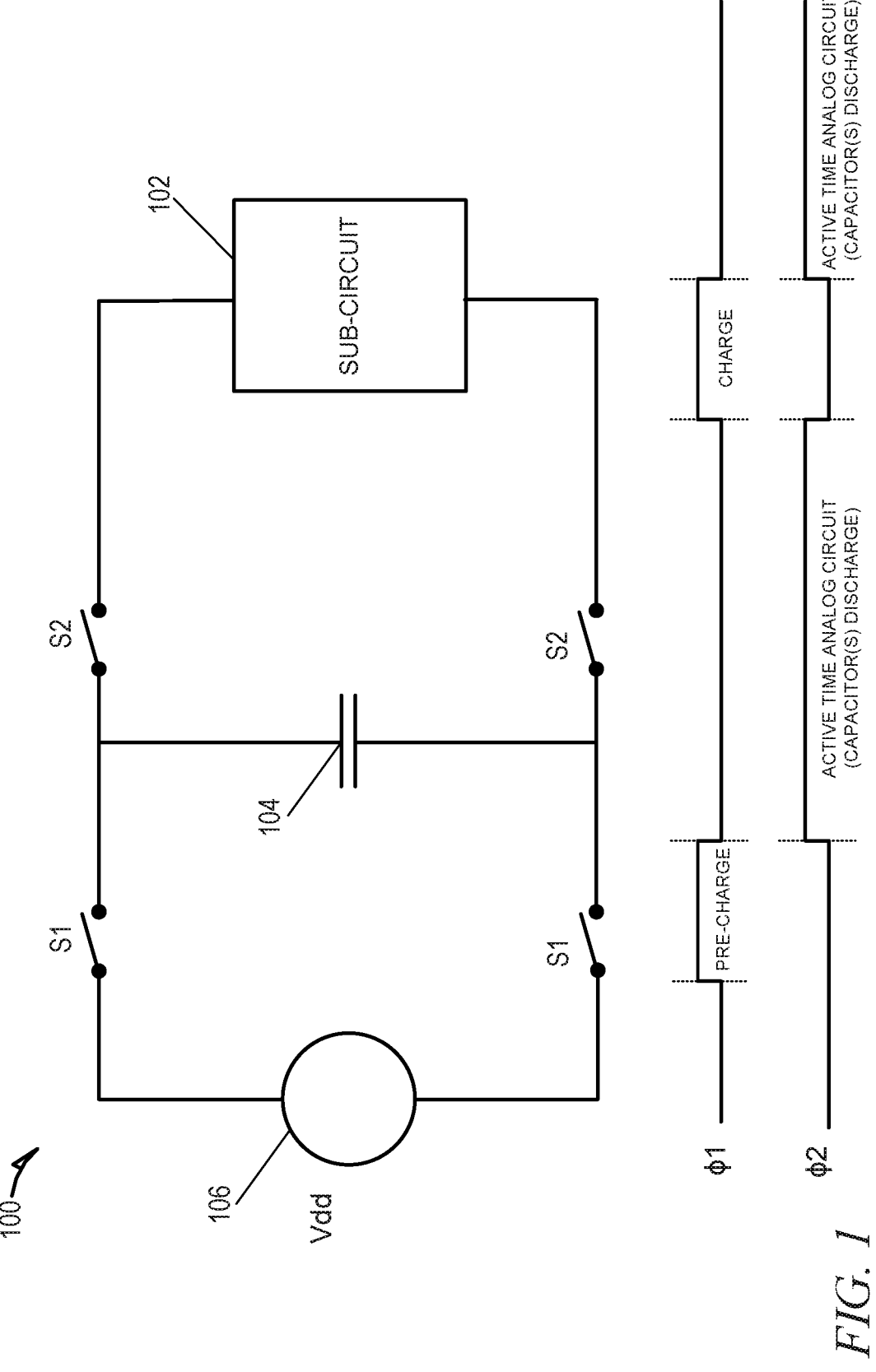
FIG. 1 is a diagram of an example circuit that includes a sub-circuit with floating capacitive supply, according to various embodiments.

In electronics, the performance of circuits, particularly analog circuits, can be compromised due to various issues, including insufficient power supply, increased noise and/or crosstalk due to a lack of sufficient space between components, etc. Modern processors (e.g., modern chips) allow high-speed data processing and large digital circuit design. However, the required power supply for modern processors is generally low. A low power supply has a relatively greater impact on analog circuits than digital circuits. Further, as the digital circuits and the analog circuits on a chip often share a common power supply, the current drawn by the digital circuits may cause insufficient power supply to the analog circuits, and vice versa.

Various embodiments include circuits and methods for providing power supply to circuits using floating capacitive supply. Specifically, A circuit includes a power supply, one or more capacitors, a sub-circuit (e.g., an analog circuit), a first plurality of switches, and a second plurality of switches. The first plurality of switches is communicatively coupled between the power supply and the capacitor. The second plurality of switches is communicatively coupled between the capacitor and the sub-circuit.

In various embodiments, the first plurality of switches and the second plurality of switches may be controlled based on a signal, such as a clock signal. For example, a $\phi 1$ signal (e.g., first signal) and a $\phi 2$ signal may be generated based on a clock signal. In various embodiments, the $\phi 1$ signal indicates charging the one or more capacitors and may control the state of both the first plurality of switches and the second plurality of switches to implement a charging configuration in the circuit. The $\phi 2$ signal indicates discharging the one or more capacitors and may control the state of the first plurality of switches and the second plurality of switches to implement a discharging configuration in the circuit 100.

In various embodiments, the charging configuration allows the one or more capacitors to be charged by the power supply. For example, the first plurality of switches coupled between the one or more capacitors and the power supply 106 is configured into a closed state to allow current to flow from the power supply to the one or more capacitors, thereby charging the one or more capacitors. Meanwhile, the second plurality of switches S2 coupled between the one or more capacitors and the sub-circuit is configured into the open state to prevent current from flowing from the one or more capacitors to the sub-circuit.

The discharging configuration allows the sub-circuit to draw current from the one or more capacitors to perform one or more functions. In the discharging configuration, the configuration of the first plurality of switches and the second plurality of switches is reversed. For example, the first plurality of switches coupled between the power supply and the one or more capacitors is configured in the open state to prevent current from flowing from the power supply to the one or more capacitors, while the second plurality of switches coupled between the one or more capacitors and the sub-circuit is configured in the closed state to allow current to flow from the one or more capacitors to the sub-circuit. This allows the sub-circuit 102 to draw current from the charged capacitor 104 to perform one or more functions.

The operational states of the first and second plurality of switches may be repeatedly alternated to shift the configuration between the charging configuration and the discharging configuration. This allows the one or more capacitors to recharge after one or more functions performed by the sub-circuit. The operational states of the first and second plurality of switches may be alternated according to any predetermined schedule, such as a timing schedule, and/or in response to one or more received or generated signals.

Reference will now be made in detail to embodiments of the present disclosure, embodiments of which are illustrated in the appended drawings. The present disclosure may, however, be embodied in many different forms and should not be construed as being limited to the embodiments set forth herein.

FIG. 1 is a diagram of an example circuit 100 that includes a sub-circuit 102 with floating capacitive supply, according to various embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a person of ordinary skill in the art will readily recognize that various additional functional components may be supported to facilitate additional functionality that is not specifically described herein. The circuit 100 may be implemented in any of a variety of electronic devices. For example, the circuit 100 may be implemented in a device including some or all of the features, components, and peripherals of the machine 700 shown in FIG. 7.

As illustrated in FIG. 1, the circuit 100 includes a power supply 106, a capacitor 104, a sub-circuit 102, a first plurality of switches S1 (also referred to as S1 switches), and a second plurality of switches S2 (also referred to as S2 switches). The first plurality of switches S1 is communicatively coupled between the power supply 106 and the capacitor 104, and the second plurality of switches S2 is communicatively coupled between the capacitor 104 and the sub-circuit 102. The sub-circuit 102 may be an analog circuit that includes one or more analog components. In various embodiments, the sub-circuit 102 may be a digital circuit that includes one or more digital components. The power supply 106 provides voltage Vdd. The value of Vdd may be configured based on the power supply needed for the sub-circuit 102 to perform one or more functions.

The switches S1 and S2 may be any type of electronic switch that is capable of coupling and decoupling electronic components within a circuit. An electronic switch may be an electronic component configured into various operational states to disconnect or connect a conducting path in an electronic circuit to interrupt or divert electrical current from one conductor to another. For example, an electronic switch may be configured in an open state to interrupt electrical current along a conducting path. Alternately, an electronic switch may be configured in a closed state to allow electrical current to pass from one conductor to another along a conducting path.

In various embodiments, the first plurality of switches S1 and the second plurality of switches S2 may be controlled based on a signal, such as a clock signal. As illustrated in FIG. 1, the $\phi$1 signal (e.g., first signal) and the $\phi$2 signal may be generated based on a clock signal. The $\phi$1 signal controls the open state and close state of the first plurality of switches S1. The $\phi$2 signal (e.g., second signal) controls the open state and close state of the second plurality of switches S2.

In various embodiments, the $\phi$1 signal indicates charging the capacitor 104 and may control the state of both the first plurality of switches S1 and the second plurality of switches S2 to implement a charging configuration in the circuit 100. The $\phi$2 signal indicates discharging the capacitor 104 and may control the state of both the first plurality of switches S1 and the second plurality of switches S2 to implement a discharging configuration in the circuit 100.

In various embodiments, the charging configuration allows the capacitor 104 to be charged by the power supply 106. For example, the first plurality of switches S1 coupled between the capacitor 104 and the power supply 106 is configured into a closed state to allow current to flow from the power supply 106 to the capacitor 104, thereby charging the capacitor 104. Meanwhile, the second plurality of switches S2 coupled between the capacitor 104 and the sub-circuit 102 is configured into the open state to prevent current from flowing from the capacitor 104 to the sub-circuit 102.

The discharging configuration allows the sub-circuit 102 to draw current from the capacitor 104 to perform one or more functions. In the discharging configuration, the configuration of the first plurality of switches S1 and the second plurality of switches S2 is reversed. For example, the first plurality of switches S1 coupled between the power supply 106 and the capacitor 104 is configured in the open state to prevent current from flowing from the power supply 106 to the capacitor 104, while the second plurality of switches S2 coupled between the capacitor 104 and the sub-circuit 102 is configured in the closed state to allow current to flow from the capacitor 104 to the sub-circuit 102. This allows for the sub-circuit 102 to draw current from the charged capacitor 104 to perform a function without negatively affecting other components with crosstalk and/or noise.

The operational states of the first and second plurality of switches S1, S2, may be repeatedly alternated to shift the configuration between the charging configuration and the discharging configuration. This allows the capacitor 104 to recharge after one or more functions performed by the sub-circuit 102. The operational states of the first and second plurality of switches S1, S2 may be alternated according to any predetermined schedule, such as a timing schedule, and/or in response to one or more received or generated signals (e.g., $\phi$1 signal, $\phi$2 signal, or clock signal).

Figure 2:
FIG. 2 is a diagram of an example circuit that includes a sub-circuit with floating capacitive supply, according to various embodiments.

FIG. 2 is a diagram of an example circuit 200 that includes a sub-circuit 202 with floating capacitive supply, according to various embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 2. However, a person of ordinary skill in the art will readily recognize that various additional functional components may be supported to facilitate additional functionality that is not specifically described herein. The circuit 200 may be implemented in any of a variety of electronic devices. For example, the circuit 100 may be implemented in a device including some or all of the features, components, and peripherals of the machine 700 shown in FIG. 7.

As illustrated in FIG. 2, the circuit 200 includes a power supply 206, a plurality of capacitors, a sub-circuit 202, a first plurality of switches S1 (also referred to as S1 switches), and a second plurality of switches S2 (also referred to as S2 switches). The plurality of capacitors includes the capacitor 204 and the capacitor 208. The first plurality of switches S1 is communicatively coupled between the power supply 206 and the plurality of capacitors (e.g., capacitors 204 and 208). The power supply 206 provides voltage Vdd. The value of Vdd may be configured based on the power supply needed for the sub-circuit 202 to perform one or more functions. The second plurality of switches S2 is communicatively coupled between the plurality of capacitors (e.g., capacitors 204 and 208) and the sub-circuit 202. The sub-circuit 202 may be an analog circuit that includes one or more analog components.

In various embodiments, the sub-circuit 202 may be a digital circuit that includes one or more digital components.

In various embodiments, the first plurality of switches S1 and the second plurality of switches S2 may be controlled based on a clock signal. The clock signal may be either generated or received by the circuit 200.

In various embodiments, φ1 signal (e.g., first signal) may be received or generated based on a clock signal to control the state (e.g., open state or close state) of the first plurality of switches S1. The φ2 signal (e.g., second signal) may control the state of the second plurality of switches S2. In various embodiments, the φ1 signal indicates charging the capacitor 204. In response to receiving the φ1 signal, the circuit 200 implements a charging configuration to configure the first plurality of switches S1 into close state and the second plurality of switches S2 into open state to allow the capacitors 204 and 208 to be charged by the power supply 206. In various embodiments, the φ2 signal indicates discharging the capacitor 204. In response to receiving the φ2 signal, the circuit 200 implements a discharging configuration to configure the first plurality of switches S1 into open state and the second plurality of switches S2 into close state to allow current to flow from the capacitors 204 and 208 to the sub-circuit 202. This allows the sub-circuit 202 to draw current from the capacitors 204 and 208 to perform one or more functions.

The operational states of the first and second plurality of switches S1, S2, may be repeatedly alternated to shift the configuration of the circuit 200 between the charging configuration and the discharging configuration. This allows the capacitors 204 and 208 to recharge after one or more functions performed by the sub-circuit 202. The operational states of the first and second plurality of switches S1, S2 may be alternated according to any predetermined schedule, such as a timing schedule, and/or in response to one or more received or generated signals (e.g., φ1 signal, φ2 signal, or clock signal).

Further, although the circuit 200 shows only one sub-circuit 202 with corresponding capacitors 204, 208; this is one example and is not meant to be limiting. Any number of sub-circuits with corresponding capacitors can be arranged. Further, any type of capacitors and sub-circuits may be used. For example, the sub-circuit may be an analog circuit.

FIG. 3A is a diagram of an example circuit 320 that includes a sub-circuit with floating capacitive supply in charging configuration, according to various embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 3A. However, a person of ordinary skill in the art will readily recognize that various additional functional components may be supported to facilitate additional functionality that is not specifically described herein. The circuit 320 may be implemented in any of a variety of electronic devices. For example, the circuit 320 may be implemented in a device including some or all of the features, components, and peripherals of the machine 700 shown in FIG. 7.

In various embodiments, the circuit 320 may be an equivalent circuit of the circuit 200 in response to receiving a φ1 signal that indicates charging the capacitors 204 and 208 (e.g., the first set of capacitors). During operations, the first plurality of switches S1 are configured to be in close state to allow current to flow from the power supply 206 to the capacitors 204 and 208, thereby charging the capacitors 204 and 208. The second plurality of switches (not shown)

is configured in an open state to prevent current from flowing from the capacitors 204 and 208 to the sub-circuit (not shown). In various embodiments, more than two capacitors can be coupled in parallel to boost the power supply to one or more sub-circuits.

FIG. 3B is a diagram of an example circuit 340 that includes a sub-circuit with floating capacitive supply in discharging configuration, according to various embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 3B. However, a person of ordinary skill in the art will readily recognize that various additional functional components may be supported to facilitate additional functionality that is not specifically described herein. The circuit 340 may be implemented in any of a variety of electronic devices. For example, the circuit 340 may be implemented in a device including some or all of the features, components, and peripherals of the machine 700 shown in FIG. 7.

In various embodiments, the circuit 340 may be an equivalent circuit of the circuit 200 in response to receiving a φ2 signal that indicates discharging the capacitors 204 and 208 (e.g., the first set of capacitors). During operations, the second plurality of switches S2 are configured to be in close state to allow the sub-circuit 202 to draw current from the capacitors 204 and 208 (communicatively coupled in series as shown) to perform one or more functions. Meanwhile, the first plurality of switches (not shown) is configured in an open state to prevent current from flowing from the power supply (not shown) to the capacitors 204 and 208.

FIG. 4 is a diagram of an example circuit 400 that includes a sub-circuit with floating capacitive supply in discharging configuration, according to various embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 4. However, a person of ordinary skill in the art will readily recognize that various additional functional components may be supported to facilitate additional functionality that is not specifically described herein. The circuit 400 may be implemented in any of a variety of electronic devices. For example, the circuit 400 may be implemented in a device including some or all of the features, components, and peripherals of the machine 700 shown in FIG. 7.

In various embodiments, the circuit 400 may be an equivalent circuit of the circuit 200 in response to receiving a φ2 signal that indicates discharging the capacitors 204 and 208 (e.g., the first set of capacitors). During operations, the second plurality of switches S2 are configured to be in close state to allow the sub-circuit 202 to draw current from the capacitors 204 and 208 to perform one or more functions. Meanwhile, the first plurality of switches (not shown) is configured in an open state to prevent current from flowing from the power supply (not shown) to the capacitors 204 and 208. The circuit 400 includes a further capacitor 410 (e.g., the third capacitor) communicatively coupled between the input port and output port of the sub-circuit 202. The further capacitor may be used to adapt the supply voltage to a lower value than the value (e.g., 2Vdd) provided by the capacitors 204 and 208 when fully charged by the power supply (not shown).

FIG. 5 is a flowchart illustrating a method 500 of providing floating capacitive supply to an example circuit during operation, according to various embodiments. The method 500 is described below by way of example with reference to the circuits 100 and 200 as illustrated in FIG. 1 and FIG. 2. However, it shall be appreciated that at least some of the operations of the method 500 may be deployed on various other hardware and/or software configurations and the method 500 is not intended to be limited to the circuits 100 and 200 as illustrated in FIG. 1 and FIG. 2.

At operation 502, a system circuit (e.g., circuit 100) is configured to receive or generate a first signal (e.g., φ1 signal) that indicates charging a capacitor (e.g., capacitor 104) in the system circuit. The system circuit includes a power supply, the capacitor, a sub-circuit, a first plurality of switches communicatively coupled between the power supply and the capacitor, and a second plurality of switches communicatively coupled between the capacitor and the sub-circuit.

At operation 504, in response to receiving or generating the first signal, the first plurality of switches (e.g., S1 switches) and the second plurality of switches (e.g., S2 switches) are configured to operate in a charging configuration. The charging configuration causes the capacitor (e.g., capacitor 104) to charge using the power supply (e.g., power supply 106). In various embodiments, the charging configuration allows the capacitor 104 to be charged by the power supply 106. For example, the first plurality of switches S1 coupled between the capacitor 104 and the power supply 106 is configured into a closed state to allow current to flow from the power supply 106 to the capacitor 104, thereby charging the capacitor 104. Meanwhile, the second plurality of switches S2 coupled between the capacitor 104 and the sub-circuit 102 is configured into the open state to prevent current from flowing from the capacitor 104 to the sub-circuit 102.

At operation 506, the system circuit (e.g., circuit 100) is configured to receive or generate a second signal (e.g., φ2 signal) that indicates supplying power from the capacitor (e.g., capacitor 104) to the sub-circuit (e.g., sub-circuit 102).

At operation 508, in response to receiving or generating the second signal, configuring the first plurality of switches S1 and the second plurality of switches S2 to operate in a discharging configuration. The discharging configuration causes the capacitor (e.g., capacitor 104) to discharge to the sub-circuit (e.g., sub-circuit 102).

The discharging configuration allows the sub-circuit 102 to draw current from the capacitor 104 to perform one or more functions. In the discharging configuration, the configuration of the first plurality of switches S1 and the second plurality of switches S2 is reversed. For example, the first plurality of switches S1 coupled between the power supply 106 and the capacitor 104 is configured in the open state to prevent current from flowing from the power supply 106 to the capacitor 104, while the second plurality of switches S2 coupled between the capacitor 104 and the sub-circuit 102 is configured in the closed state to allow current to flow from the capacitor 104 to the sub-circuit 102. This allows for the sub-circuit 102 to draw current from the charged capacitor 104 to perform a function without negatively affecting other components with crosstalk and/or noise.

The operational states of the first and second plurality of switches S1, S2, may be repeatedly alternated to shift the configuration between the charging configuration and the discharging configuration. This allows the capacitor 104 to recharge after one or more functions performed by the sub-circuit 102. The operational states of the first and second plurality of switches S1, S2 may be alternated according to any predetermined schedule, such as a timing schedule, and/or in response to one or more received or generated signals (e.g., φ1 signal, φ2 signal, or clock signal).

Figure 6:
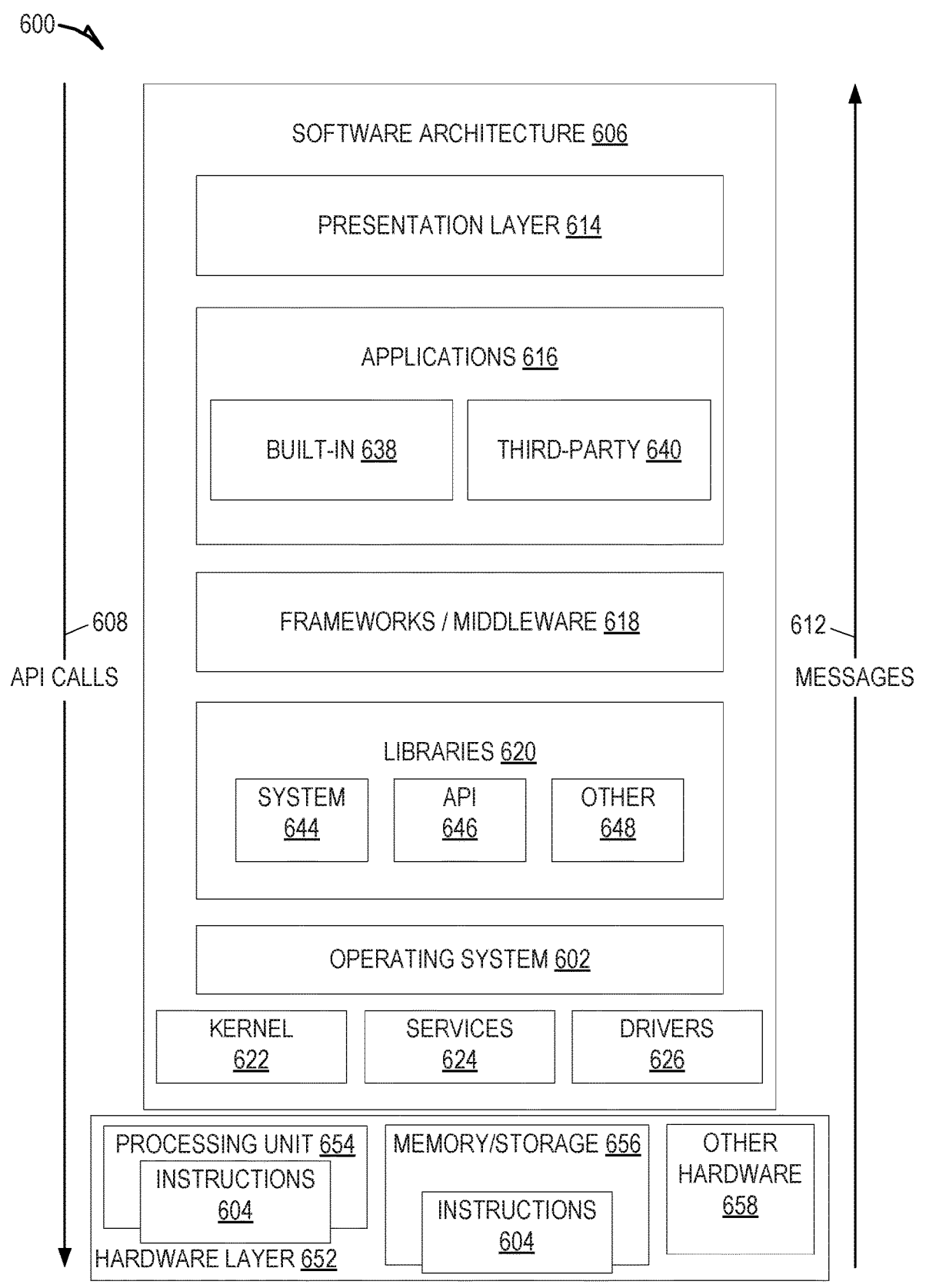
FIG. 6 depicts a block diagram illustrating an architecture of software, according to some embodiments.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality, such as the Open Systems Interconnection model (OSI model). For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system.

Alternatively, or additionally, in some systems, interactions with a user may occur through a presentation layer, such as presentation layer 614. In these systems, the application/component "logic" can be separated from the aspects of the application/component that interact with a user.

Figure 7:
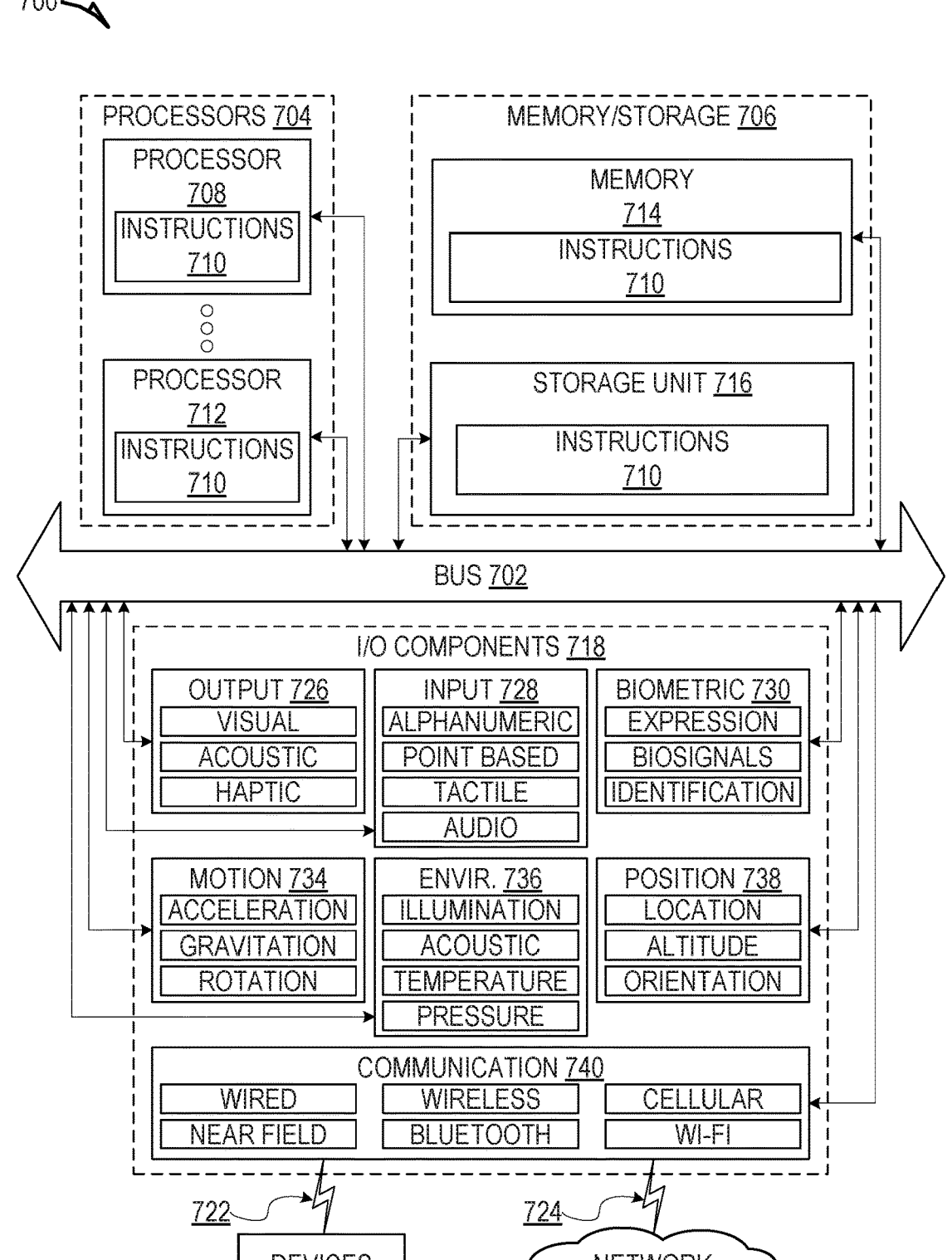
FIG. 7 illustrates a diagrammatic representation of a machine in the form of a computer system within which a set of instructions may be executed for causing a machine to perform any one or more of the methodologies discussed herein, according to some embodiments.

FIG. 7 is a block diagram illustrating components of a machine 700, according to some embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine

700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704 (e.g., 708, 710), memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704.

Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some embodiments, the processors 704 or processor-implemented components may be located in a single geographic location (e.g., within a home environment, an office environment, or a server farm). In other embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A circuit comprising:
a power supply;
a first capacitor;
a second capacitor,
a sub-circuit comprising an input port and an output port, the second capacitor being coupled opertatively coupled between the input port and the output port;
a first plurality of switches operatively coupling the power supply and the first capacitor in parallel; and
a second plurality of switches operatively coupling the first capacitor and the sub-circuit in parallel, the first plurality of switches and the second plurality of switches being operated in mutually exclusive states such that when the first plurality of switches is closed, the second plurality of switches is open, and vice versa;
during a discharging configuration:
the first plurality of switches being in an open state to prevent current from flowing from the power supply to the first capacitor; and
the second plurality of switches being in a closed state to allow current to flow from the first capacitor to the sub-circuit such that the sub-circuit is powered by a floating capacitive supply;
during a charging configuration:
the first plurality of switches being in a closed state to allowed current to flow from the power supply to the first capacitor; and
the second plurality of switches being in an open state to prevent current from flowing from the first capacitor to the sub-circuit.

2. The circuit of claim 1, wherein the sub-circuit comprises one or more analog components.

3. The circuit of claim 1, wherein the first plurality of switches and the second plurality of switches are controlled based on a clock signal.

4. The circuit of claim 1, further comprising:
a first set of capacitors that includes the first capacitor.

5. The circuit of claim 4, wherein capacitors in the first set of capacitors are operatively coupled in parallel during the charging configuration in the circuit.

6. The circuit of claim 4, wherein capacitors in the first set of capacitors are operatively coupled in series during the discharging configuration in the circuit.

7. A method comprising:
receiving a first signal to charge a first capacitor in a system circuit, the system circuit comprising a power supply, the first capacitor, a second capacitor, a sub-circuit, a first plurality of switches operatively coupling the power supply and the first capacitor in parallel, and a second plurality of switches operatively coupling the first capacitor and the sub-circuit in parallel, the sub-circuit comprising an input port and an output port, the second capacitor being coupled operatively coupled between the input port and the output port, the first plurality of switches and the second plurality of switches being operated in mutually exclusive states such that when the first plurality of switches is closed, the second plurality of switches is open, and vice versa;
in response to receiving the first signal, configuring the first plurality of switches and the second plurality of switches to operate in a charging configuration, the charging configuration causing the first capacitor to charge using the power supply, the configuring of the first plurality of switches and the second plurality of switches to operate in the charging configuration comprising:

configuring the first plurality of switches in a closed state to allow current to flow from the power supply to the first capacitor; and configuring the second plurality of switches in an open state to prevent current from flowing from the first capacitor to the sub-circuit;

receiving a second signal to supply power from the first capacitor to the sub-circuit; and in response to receiving the second signal, configuring the first plurality of switches and the second plurality of switches to operate in a discharging configuration, the discharging configuration causing the first capacitor to discharge to the sub-circuit, the configuring of the first plurality of switches and the second plurality of switches to operate in the discharging configuration comprising:

configuring the first plurality of switches in an open state to prevent current from flowing from the power supply to the first capacitor; and configuring the second plurality of switches in a closed state to allow current to flow from the first capacitor to the sub-circuit.

8. The method of claim 7, wherein the sub-circuit comprises one or more analog components.

9. The method of claim 7, wherein the first plurality of switches and the second plurality of switches are controlled based on a clock signal.

10. The method of claim 7, wherein the system circuit comprises a first set of capacitors that includes the first capacitor.

11. The method of claim 10, wherein capacitors in the first set of capacitors are operatively coupled in parallel during the charging configuration in the system circuit.

12. The method of claim 10, wherein capacitors in the first set of capacitors are operatively coupled in series during the discharging configuration in the system circuit.

* * * * *